US012774409B2

(12) United States Patent
Yu et al.

(10) Patent No.: US 12,774,409 B2
(45) Date of Patent: Oct. 27, 2026

(54) GEL TEMPORARY PLUGGING AGENT AND PREPARATION METHOD AND USE THEREOF

(71) Applicant: Yangtze University, Jingzhou (CN)

(72) Inventors: Xiaorong Yu, Jingzhou City (CN); Zhengyang Fan, Jingzhou City (CN); Renjing Ji, Jingzhou City (CN); Jingyi Cui, Jingzhou City (CN); Sicheng Zhu, Jingzhou City (CN); Wenjie Li, Jingzhou City (CN); Xudong Wang, Jingzhou City (CN); Huan Yang, Jingzhou City (CN); Gaoshen Su, Jingzhou City (CN)

(73) Assignee: YANGTZE UNIVERSITY, Jingzhou City (CN)

( * ) Notice: Subject to any disclaimer, the term of this patent is extended or adjusted under 35 U.S.C. 154(b) by 0 days.

(21) Appl. No.: 19/316,312

(22) Filed: Sep. 2, 2025

(65) Prior Publication Data

US 2026/0071112 A1 Mar. 12, 2026

(30) Foreign Application Priority Data

Sep. 6, 2024 (CN) ......................... 202411252519.9

(51) Int. Cl.

*C09K 8/514* (2006.01)
*C09K 8/512* (2006.01)
*C09K 8/516* (2006.01)
*E21B 33/138* (2006.01)

(52) U.S. Cl.

CPC .............. *C09K 8/514* (2013.01); *C09K 8/512* (2013.01); *C09K 8/516* (2013.01); *E21B 33/138* (2013.01)

(58) Field of Classification Search

CPC ........ C09K 8/426; C09K 8/512; C09K 8/516; C09K 8/514; E21B 33/13; E21B 33/138
See application file for complete search history.

(56) References Cited

FOREIGN PATENT DOCUMENTS

WO WO-2009153751 A2 * 12/2009 .............. A61P 43/00

OTHER PUBLICATIONS

English translation of CN 109777387. (Year: 2019).*

* cited by examiner

*Primary Examiner* — Zakiya W Bates
(74) *Attorney, Agent, or Firm* — Jason A. Smith; Shumaker, Loop & Kendrick, LLP

(57) ABSTRACT

A method for preparing a gel temporary plugging agent, including mixing 2% to 10% of an animal protein, 8% to 30% of a gelation promoter, 2% to 10% of a reinforcing agent, 0.5% % to 2% of a cross-linking agent, 0.5% to 2% of a gelation inducer, and water as a balance, and then performing gelation to obtain the gel temporary plugging agent; where the gelation promoter includes a distiller's grains-filtered liquid.

2 Claims, No Drawings

GEL TEMPORARY PLUGGING AGENT AND PREPARATION METHOD AND USE THEREOF

CROSS REFERENCE TO RELATED APPLICATION

This patent application claims the benefit and priority of Chinese Patent Application No. 202411252519.9, entitled "Gel temporary plugging agent and preparation method and use thereof" filed on Sep. 6, 2024, the disclosure of which is incorporated by reference herein in its entirety as part of the present application.

TECHNICAL FIELD

The present disclosure relates to the technical field of oilfield chemistry, and particularly to a gel temporary plugging agent and a preparation method and use thereof.

BACKGROUND ART

Acidizing and plug removal technology is a petroleum engineering technology that uses acidic substances to chemically dissolve the formation, remove formation blockages, and restore or improve formation productivity. It is mainly used to enhance oil well productivity during oilfield development. However, due to severe formation heterogeneity, the phenomenon of acid solution "fingering" in high-permeability zones often occurs during conventional acidizing processes, leading to poor acidizing effects in low-permeability reservoirs and failure to effectively remove blockages and increase production.

To solve the above problem, temporary plugging acidizing technology has been proposed, aiming to temporarily plug high-permeability zones and then perform acidizing treatment to improve the permeability of low-permeability zones and blocked oil layers, thereby achieving uniform acid distribution. In temporary plugging acidizing technology, the selection of the temporary plugging agent is crucial.

Commonly-used temporary plugging agents include fiber temporary plugging agents and gel temporary plugging agents. Among them, fiber temporary plugging agents are made from chemical fibers with high aspect ratios and modified products thereof, such as polyvinyl alcohol fibers, polylactic acid fibers, and polyester fibers. These fiber temporary plugging agents have flexibility, plasticity, and high length-to-diameter ratios, enabling the formation of effective filter mesh structures. However, they tend to agglomerate and cause pipeline blockages, and they are also prone to be unbound in field applications, and have high usage costs. Gel temporary plugging agents could be made into particles, which would not cause pipeline blockages, and are easier to be stored and transported by fluid into pore throats or fractures.

Currently, most gel temporary plugging agents have a main component of partially-hydrolyzed polyacrylamide, which can only self-degrade at a medium to high temperature (70-180° C.) or in a high salinity environment, and do not meet the degradation requirements of low-temperature reservoirs (<60° C.). Although the prior art CN111621273A discloses a temporary plugging agent that is rapidly dissolved and suitable in low temperatures, the actual applicable temperature is 85-96° C., which actually still falls within the medium to high temperature range.

SUMMARY

An object of the present disclosure is to provide a gel temporary plugging agent and a preparation method and use thereof. The gel temporary plugging agent provided by the present disclosure can be applied for temporary plugging in low-temperature reservoirs at 20-60° C.

To achieve the above object, the present disclosure provides the following technical solutions:

The present disclosure provides a gel temporary plugging agent, including: an animal protein structural unit, a reinforcing agent structural unit, and a cross-linking structural unit, where the animal protein structural unit and the reinforcing agent structural unit are chemically bonded via the cross-linking structural unit to form a three-dimensional network structure.

In some embodiments, an animal protein in the animal protein structural unit includes one selected from the group consisting of bovine serum albumin and whey protein.

In some embodiments, the reinforcing agent structural unit is an acrylamide structural unit or an acrylamide sulfonic structural unit.

In some embodiments, a mass ratio of the animal protein structural unit to the reinforcing agent structural unit is in a range of 0.4:1 to 2:1.

In some embodiments, the cross-linking structural unit is formed from N,N-methylenebisacrylamide, dimethyldiallylammonium chloride, or divinylbenzene.

The present disclosure also provides a method for preparing the gel temporary plugging agent described in the above technical solutions, including:

- mixing the animal protein, a gelation promoter, a reinforcing agent, a cross-linking agent, a gelation inducer, and water, and then performing gelation to obtain the gel temporary plugging agent.

In some embodiments, the gelation promoter includes a distiller's grains-filtered liquid.

In some embodiments, in percentages by mass, raw materials are in the following amounts: 2% to 10% of the animal protein, 8% to 30% of the gelation promoter, 2% to 10% of the reinforcing agent, 0.5% % to 2% % of the cross-linking agent, 0.5% to 2% of the gelation inducer, and a balance being water.

In some embodiments, in percentages by mass, raw materials are in the following amounts: 2% to 10% of the animal protein, 8% to 30% of the gelation promoter, 2% to 10% of the reinforcing agent, 0.5% to 2% of the cross-linking agent, 0.5% % to 2% % of the gelation inducer, and a balance being water.

In some embodiments, the gelation is performed at a temperature of 85-90° C. for 1.5-2 hours.

The present disclosure also provides use of the gel temporary plugging agent described in the above technical solutions or the gel temporary plugging agent prepared by the method described in the above technical solutions in temporary plugging of low-temperature reservoirs.

The present disclosure provides a gel temporary plugging agent, including an animal protein structural unit, a reinforcing agent structural unit, and a cross-linking structural unit, wherein the animal protein structural unit and the reinforcing agent structural unit are chemically bonded via the cross-linking structural unit to form a three-dimensional network structure. The gel temporary plugging agent provided by the present disclosure has a three-dimensional network structure formed by cross-linking the animal protein, which can be degraded into linear polypeptide chains in an acid solution under a low-temperature condition, thereby achieving a temporary plugging effect. The gel temporary plugging agent is reinforced by introducing a reinforcing agent structural unit to ensure the plugging performance of the gel temporary plugging agent, enabling it to achieve plugging in low-temperature reservoirs. Example results show that the gel temporary plugging agent prepared by the present disclosure can achieve: a hardness of 42.0 N, an elasticity of 9.50 mm, and a plugging pressure of 24.69 MPa at a permeability of 1105.2 mD; the degradation time can be controlled within 1.3-4.1 days.

DETAILED DESCRIPTION OF THE EMBODIMENTS

The present disclosure provides a gel temporary plugging agent, including or consisting of: an animal protein structural unit, a reinforcing agent structural unit, and a cross-linking structural unit, where the animal protein structural unit and the reinforcing agent structural unit are chemically bonded via the cross-linking structural unit to form a three-dimensional network structure.

The gel temporary plugging agent provided by the present disclosure contains an animal protein structural unit. In the present disclosure, the animal protein structural unit formed by cross-linking an animal protein has a three-dimensional network structure, which can be degraded into linear polypeptide chains in an acid solution under a low-temperature condition, thereby achieving a temporary plugging effect.

In some embodiments of the present disclosure, the animal protein in the animal protein structural unit includes one of bovine serum albumin and whey protein. In the present disclosure, the type of the animal protein is defined to ensure more sufficient cross-linking to form the animal protein structural unit.

The gel temporary plugging agent provided by the present disclosure contains a reinforcing agent structural unit. In the present disclosure, the reinforcing agent unit formed by cross-linking a reinforcing agent can enhance the hardness, elasticity, and plugging pressure of the gel temporary plugging agent, which thereby improves the plugging strength, and ensures the plugging performance of the gel temporary plugging agent, thereby enabling it to achieve plugging in low-temperature reservoirs, and shorten the gelation time of the gel temporary plugging agent.

In some embodiments of the present disclosure, the reinforcing agent structural unit is an acrylamide structural unit or an acrylamide sulfonic structural unit. In the present disclosure, the type of the reinforcing agent structural unit is defined to more fully improve the hardness, elasticity, plugging pressure of the gel temporary plugging agent, and shorten its gelation time.

In some embodiments of the present disclosure, an acrylamide sulfonic acid in the acrylamide sulfonic structural unit includes one selected from the group consisting of 2-acrylamido-2-methylpropanesulfonic acid (AMPS), 2-acrylamido-2-phenylethanesulfonic acid (AMSS), 2-acrylamido-dodecylsulfonic acid (ADS), and 2-acrylamido-tetradecylsulfonic acid (ATS). In the present disclosure, by defining the type of acrylamide sulfonic acid in the acrylamide sulfonic structural unit, the hardness, elasticity, plugging pressure of the gel temporary plugging agent are further improved, and the gelation time thereof is shortened.

In some embodiments of the present disclosure, a mass ratio of the animal protein structural unit to the reinforcing agent structural unit is in a range of (0.2-5): 1, preferably (1-3): 1. In the present disclosure, by defining the mass ratio of the animal protein structural unit to the reinforcing agent structural unit, it further ensures short gelation time, high plugging strength, and controllable degradation time of the gel temporary plugging agent.

The gel temporary plugging agent provided by the present disclosure contains a cross-linking structural unit. In the present disclosure, the animal protein structural unit and the reinforcing agent structural unit are chemically bonded via the cross-linking structural unit to form a three-dimensional network structure, achieving plugging of low-temperature reservoirs.

In some embodiments of the present disclosure, the cross-linking structural unit is formed by N,N-methylenebisacrylamide, dimethyldiallylammonium chloride, or divinylbenzene. In the present disclosure, it enables more sufficient formation of the three-dimensional network structure from the animal protein structural unit and the reinforcing agent structural unit by limiting the type of the cross-linking agent in the cross-linking structural unit.

The gel temporary plugging agent provided by the present disclosure has a three-dimensional network structure formed by cross-linking the animal protein, which can be degraded into linear polypeptide chains in an acid solution under a low-temperature condition, thereby achieving a temporary plugging effect; the gel temporary plugging agent is reinforced by introducing a reinforcing agent structural unit to ensure the plugging performance of the gel temporary plugging agent, thereby enabling it to achieve plugging in low-temperature reservoirs.

The present disclosure also provides a method for preparing the above gel temporary plugging agent, including or consisting of:

mixing an animal protein, a gelation promoter, a reinforcing agent, a cross-linking agent, a gelation inducer, and water, and then performing gelation to obtain the gel temporary plugging agent.

In the present disclosure, the animal protein, the gelation promoter, the reinforcing agent, the cross-linking agent, the gelation inducer, and water are mixed, and gelation is then performed to obtain the gel temporary plugging agent.

In some embodiments of the present disclosure, the gelation promoter is a distiller's grains-filtered liquid. In the present disclosure, by limiting the type of the gelation promoter, the gelation time of the animal protein is further shortened.

In some embodiments of the present disclosure, the composition of the distiller's grains-filtered liquid includes: 13.4 g/100 g of total peptides, 153597.00-162754.00 mg/L of lactic acid, 0.29-0.33 g/100 mL of aspartic acid, 0.13-0.18 g/100 mL of threonine, 0.23-0.25 g/100 mL of serine, 0.61-0.67 g/100 mL of glutamic acid, 0.18-0.25 g/100 mL of glycine, 0.38-0.41 g/100 mL of alanine, 0.044-0.058 g/100 mL of cystine, 0.24-0.40 g/100 mL of valine, 0.054-0.066 g/100 mL of methionine, 0.24-0.30 g/100 mL of isoleucine, 0.34-0.39 g/100 mL of leucine, 0.077-0.098 g/100 mL of tyrosine, 0.18-0.26 g/100 mL of phenylalanine, 0.16-0.24 g/100 mL of lysine, 0.046-0.086 g/100 mL of histidine, 0.078-0.084 g/100 mL of arginine, and 0.29-0.37 g/100 mL of proline. In the present disclosure, it ensures more sufficient promotion of animal protein gel formation by limiting the composition of the distiller's grains-filtered liquid.

In the present disclosure, there is no particular limitation on the process for preparing the distiller's grains-filtered liquid, and any well-known method in the art for preparing the distiller's grains-filtered liquid may be used. In some embodiments of the present disclosure, the distiller's grains-filtered liquid is prepared by a process including the following steps:

1) mixing yellow water produced during the liquor brewing process with ethanol, and then purifying a resulting mixture by heating to obtain purified yellow water; and 2) concentrating the purified yellow water obtained in step 1) to obtain the distiller's grains-filtered liquid.

In some embodiments of the present disclosure, yellow water produced during the liquor brewing process is mixed with ethanol, and a resulting mixture is purified by heating, to obtain purified yellow water.

In the present disclosure, there is no particular limitation on the extraction process of the yellow water produced during the liquor brewing process, and any well-known extraction method in the art may be used. In some embodiments of the present disclosure, the extraction of yellow water produced during the liquor brewing process is performed by filtration.

In some embodiments of the present disclosure, a mass ratio of the yellow water produced during the liquor brewing process to ethanol is in a range of 1:(2-4), preferably 1:3. In the present disclosure, it ensures more sufficient purification of the yellow water produced during the liquor brewing process by limiting the mass ratio of the yellow water to the ethanol.

In the present disclosure, there is no particular limitation on the mixing of the yellow water produced during the liquor brewing process and ethanol, and any well-known mixing means in the art may be used.

In some embodiments of the present disclosure, the purifying by heating is performed at a temperature of 105-110° C.; in some embodiments, the purifying by heating is performed for 30-45 minutes. In the present disclosure, it ensures more sufficient dissolution of the yellow water produced during the liquor brewing process and more complete removal of impurities from the yellow water by limiting the temperature and time of the purifying by heating.

In some embodiments of the present disclosure, after the purifying by heating, the process further includes: filtering a resulting solution after the purifying by heating, followed by cooling, to obtain purified yellow water.

In the present disclosure, there is no particular limitation on the filtration, and any well-known filtration means in the art may be used.

In some embodiments of the present disclosure, the cooling is performed by cooling a filtered solution to a temperature of 80-90° C.

In some embodiments of the present disclosure, after obtaining the purified yellow water, the purified yellow water is concentrated to obtain the distiller's grains-filtered liquid.

In some embodiments of the present disclosure, the concentration is performed at a temperature of 90-95° C. In some embodiments of the present disclosure, the concentration is stopped when a solid content of 50% to 53% is reached.

In some embodiments of the present disclosure, the gelation inducer is potassium persulfate. In the present disclosure, it ensures more complete gelation by limiting the type of the gelation inducer.

In some embodiments of the present disclosure, in percentages by mass, raw materials are as follows: 2% to 10% of the animal protein, 8% to 30% of the gelation promoter, 2% to 10% of the reinforcing agent, 0.5% % to 2% % of the cross-linking agent, 0.5% to 2% of the gelation inducer, and a balance being water.

In some embodiments of the present disclosure, in percentages by mass, the raw materials for the gel temporary plugging agent include 2% to 10%, preferably 6% to 8% of the animal protein. In the present disclosure, the temporary plugging performance is further improved by limiting the content of the animal protein.

In some embodiments of the present disclosure, in percentages by mass, the raw materials for the gel temporary plugging agent include 8% to 30%, preferably 10% to 20% of the gelation promoter. In the present disclosure, the formation of gel from the animal protein is further promoted by limiting the content of the gelation promoter.

In some embodiments of the present disclosure, in percentages by mass, the raw materials for the gel temporary plugging agent include 2% to 10%, preferably 4% to 8% of the reinforcing agent. In the present disclosure, by limiting the content of the reinforcing agent, the hardness, elasticity, and plugging pressure of the prepared gel temporary plugging agent are further improved, thereby enhancing the plugging performance, and further shortening the gelation time of the gel temporary plugging agent.

In some embodiments of the present disclosure, in percentages by mass, the raw materials for the gel temporary plugging agent include 0.5% to 2%, preferably 1% to 1.5% of the cross-linking agent. In the present disclosure, by limiting the amount of cross-linking agent added, it ensures more sufficient formation of the three-dimensional network structure from the animal protein structural unit and the reinforcing agent structural unit, thereby improving the temporary plugging performance of the gel temporary plugging agent.

In some embodiments of the present disclosure, in percentages by mass, the raw materials for the gel temporary plugging agent include 0.5%-2%, preferably 1%-1.5% of the gelation inducer. In the present disclosure, by limiting the amount of the gelation inducer added, it ensures a more complete reaction between the animal protein, the reinforcing agent, and the cross-linking agent.

In some embodiments of the present disclosure, in percentages by mass, the raw materials for the gel temporary plugging agent include water as the balance. In the present disclosure, by limiting the amount of water added, it ensures more complete dissolution of reactants, and thus a more complete reaction.

In some embodiments of the present disclosure, the animal protein, the gelation promoter, the reinforcing agent, the cross-linking agent, the gelation inducer, and water are mixed by stirring. In some embodiments of the present disclosure, the stirring is performed at a rate of 300-600 r/s, preferably 400 r/s.

In some embodiments of the present disclosure, the gelation is performed at a temperature of 85-90° C.; in some embodiments, the gelation is performed for 1.5-2 hours. In the present disclosure, it ensures sufficient gel formation from the animal protein by limiting the temperature and time for gelation.

In some embodiments, after gelation, the method further includes crushing a gelled product to obtain the gel temporary plugging agent.

In some embodiments of the present disclosure, the gel temporary plugging agent has a particle size of 1-3 mm. In the present disclosure, it is more conducive to entering low-temperature reservoirs and achieving temporary plugging in low-temperature reservoirs by limiting the particle size of the gel temporary plugging agent.

In the present disclosure, there is no particular limitation on the crushing equipment, and any well-known crushing equipment in the art may be used.

In the method for preparing the gel temporary plugging agent provided by the present disclosure, the animal protein, the gelation promoter, the reinforcing agent, the cross-linking agent, the gelation inducer, and water are mixed, and fully gelled at a certain temperature, to obtain the gel temporary plugging agent.

The present disclosure also provides use of the gel temporary plugging agent described in the above technical solutions or the gel temporary plugging agent prepared by the method described in the above technical solutions in temporary plugging of low-temperature reservoirs.

In some embodiments of the present disclosure, under a condition that the low-temperature reservoir is a fracture opening or near-wellbore zone, the gel temporary plugging agent is mixed with a carrier fluid and then injected into a substratum. In some embodiments of the present disclosure, a mass percentage of the gel temporary plugging agent is 5% to 15% of a total amount of the gel temporary plugging agent and the carrier fluid. In the present disclosure, there is no particular limitation on the carrier fluid, and any well-known carrier fluid in the art may be used.

In some embodiments of the present disclosure, under a condition that the temporary plugging of low-temperature reservoirs is required inside fractures and in deep formation, the raw materials for preparing the gel temporary plugging agent are mixed and then injected into the formation for gelation.

In some embodiments, the gel temporary plugging agent provided by the present disclosure is applied for temporary plugging in low-temperature reservoirs at 20-60° C.

The technical solutions of the present disclosure will be described clearly and completely below in conjunction with examples of the present disclosure. Obviously, the described examples are only a part of the examples of the present disclosure, not all of them. Based on the examples of the present disclosure, all other examples obtained by persons of ordinary skill in the art without creative efforts shall fall within the scope of the present disclosure.

In examples below, the distiller's grains-filtered liquid used was composed of 13.4 g/100 g of total peptides, 153597.00-162754.00 mg/L of lactic acid, 0.29-0.33 g/100 mL of aspartic acid, 0.13-0.18 g/100 mL of threonine, 0.23-0.25 g/100 mL of serine, 0.61-0.67 g/100 mL of glutamic acid, 0.18-0.25 g/100 mL of glycine, 0.38-0.41 g/100 mL of alanine, 0.044-0.058 g/100 mL of cystine, 0.24-0.40 g/100 mL of valine, 0.054-0.066 g/100 mL of methionine, 0.24-0.30 g/100 mL of isoleucine, 0.34-0.39 g/100 mL of leucine, 0.077-0.098 g/100 mL of tyrosine, 0.18-0.26 g/100 mL of phenylalanine, 0.16-0.24 g/100 mL of lysine, 0.046-0.086 g/100 mL of histidine, 0.078-0.084 g/100 mL of arginine, and 0.29-0.37 g/100 mL of proline.

Example 1

Provided was a gel temporary plugging agent, composed of a bovine serum albumin structural unit, an acrylamide reinforcing agent structural unit, and a cross-linking structural unit formed by N,N'-methylenebisacrylamide, wherein the animal protein structural unit and the reinforcing agent structural unit were chemically bonded via the cross-linking structural unit to form a three-dimensional network structure; and a mass ratio of the animal protein structural unit to the reinforcing agent structural unit was 0.25:1.

The above gel temporary plugging agent was prepared by a method consisting of the following steps:

In percentages by mass, 2% of bovine serum albumin, 20% of the distiller's grains-filtered liquid, 8% of acrylamide reinforcing agent, 0.5% of N,N'-methylenebisacrylamide cross-linking agent, 3% % of ammonium persulfate gelation inducer, and the balance of water were mixed by stirring at 400 r/s, and a resulting mixture was reacted at 85° C. for 1.5 hours for gelation, followed by crushing to obtain a gel temporary plugging agent with a particle size of 0.83 mm to 0.18 mm.

Example 2

This example was performed according to Example 1, except that: 2% of the bovine serum albumin in Example 1 was changed to 4% of the bovine serum albumin.

Example 3

This example was performed according to Example 1, except that: 2% of the bovine serum albumin in Example 1 was changed to 6% of the bovine serum albumin.

Example 4

This example was performed according to Example 1, except that: 2% of the bovine serum albumin in Example 1 was changed to 8% of the bovine serum albumin.

Example 5

This example was performed according to Example 1, except that: 2% of the bovine serum albumin in Example 1 was changed to 10% of the bovine serum albumin.

Example 6

This example was performed according to Example 1, except that: 2% of the bovine serum albumin in Example 1 was replaced with 2% of whey protein.

Example 7

This example was performed according to Example 1, except that: 2% of the bovine serum albumin in Example 1 was replaced with 4% of whey protein.

Example 8

This example was performed according to Example 1, except that: 2% of the bovine serum albumin in Example 1 was replaced with 6% of whey protein.

Example 9

This example was performed according to Example 1, except that: 2% of the bovine serum albumin in Example 1 was replaced with 8% of whey protein.

Example 10

This example was performed according to Example 1, except that: 2% of the bovine serum albumin in Example 1 was replaced with 10% of whey protein. 2 g of the gel temporary plugging agents prepared in Examples 1-10 were separately placed in 50 mL of an aqueous hydrochloric acid solution (with a volume fraction of 20%) at 60° C. for acidification, and when being degraded to a mass <0.1 g, the time was recorded as the degradation time. The degradation performance of the gel temporary plugging agents prepared in Examples 1-10 was obtained, as shown in Table 1.

TABLE 1

Degradation performance of the gel temporary plugging agents prepared in Examples 1-10

| No. | Bovine serum albumin content | Degradation time/D | No. | Whey protein content | Degradation time/D |
|---|---|---|---|---|---|
| Example 1 | 2% | 1.3 | Example 6 | 2% | 1.6 |
| Example 2 | 4% | 2.2 | Example 7 | 4% | 2.4 |
| Example 3 | 6% | 3.2 | Example 8 | 6% | 3.7 |
| Example 4 | 8% | 3.6 | Example 9 | 8% | 4.1 |
| Example 5 | 10% | 4.1 | Example 10 | 10% | 4.7 |

As can be seen from Table 1, as the content of bovine serum albumin or whey protein increases, the degradation time of the prepared gel temporary plugging agent gradually increases; the gel temporary plugging agent prepared with the bovine serum albumin has a shorter degradation time than that prepared with whey protein of the same content. Therefore, the degradation time could be adjusted by changing the content of the bovine serum albumin or whey protein.

Example 11

Provided was a gel temporary plugging agent, composed of a bovine serum albumin structural unit, an acrylamide reinforcing agent structural unit, and a cross-linking structural unit formed by N,N-methylenebisacrylamide, where the animal protein structural unit and the reinforcing agent structural unit were chemically bonded via the cross-linking structural unit to form a three-dimensional network structure; and a mass ratio of the animal protein structural unit to the reinforcing agent structural unit was 1.6:1.

The above gel temporary plugging agent was prepared by a method consisting of the following steps:

In percentages by mass, 8% of bovine serum albumin, 20% of the distiller's grains-filtered liquid, 5% of acrylamide reinforcing agent, 0.25% of N,N-methylenebisacrylamide cross-linking agent, 3% % of ammonium persulfate gelation inducer, and water were mixed by stirring at 400 r/s, and a resulting mixture was placed in a blue-cap bottle which was then placed in a water bath at 80° C. for gelation, to obtain the gel temporary plugging agent.

Example 12

This example was performed according to Example 11, except that: 5% of the reinforcing agent in Example 11 was changed to 10% of the reinforcing agent.

Comparative Example 1

This comparative example was performed according to Example 11, except that: 5% of the reinforcing agent in Example 11 was changed to 15% of the reinforcing agent.

Comparative Example 2

This comparative example was performed according to Example 11, except that: 5% of the reinforcing agent in Example 11 was changed to 20% of the reinforcing agent.

Comparative Example 3

This comparative example was performed according to Example 11, except that: 5% of the reinforcing agent in Example 11 was changed to 25% of the reinforcing agent.

Comparative Example 4

This comparative example was performed according to Example 11, except that: 5% of the reinforcing agent in Example 11 was changed to 30% of the reinforcing agent. The blue-cap bottles used for gelation in Examples 11-12 and Comparative Examples 1-4 were inverted at regular intervals. The time when the reaction solution lost its flowability was defined as the gelation time. The results are shown in Table 2.

TABLE 2

Gelation time of reaction solutions of the gel temporary plugging agents in Examples 11-12 and Comparative Examples 1-4

| No. | Reinforcing agent content | Gelation time/min |
|---|---|---|
| Example 11 | 5% | 5.5 |
| Example 12 | 10% | 5.2 |
| Comparative Example 1 | 15% | 4.8 |
| Comparative Example 2 | 20% | 4.0 |
| Comparative Example 3 | 25% | 3.7 |
| Comparative Example 4 | 30% | 3.5 |

As can be seen from Table 2, as the concentration of the reinforcing agent increases, the gelation time decreases. The gelation time could be controlled within a certain range by changing the concentration of the reinforcing agent.

Example 13

Provided was a gel temporary plugging agent, composed of a bovine serum albumin structural unit, an acrylamide reinforcing agent structural unit, and a cross-linking structural unit formed by N,N'-methylenebisacrylamide, where the bovine serum albumin structural unit and the reinforcing agent structural unit were chemically bonded via the cross-linking structural unit to form a three-dimensional network structure; and a mass ratio of the animal protein structural unit to the reinforcing agent structural unit was 1:1.

The above gel temporary plugging agent was prepared by a method consisting of the following steps:

In percentages by mass, 2% of bovine serum albumin, 20% of the distiller's grains-filtered liquid, 2% of acrylamide reinforcing agent, 0.15% of N,N'-methylenebisacrylamide cross-linking agent, 1.5% % of ammonium persulfate gelation inducer, and water were mixed by stirring at 400 r/s, and a resulting mixture was reacted at 85° C. for 2 hours for gelation, to obtain a gel temporary plugging agent with a particle size of 0.83-0.18 mm.

Example 14

This example was performed according to Example 13, except that: 2% of the reinforcing agent in Example 13 was changed to 4% of the reinforcing agent.

Example 15

This example was performed according to Example 13, except that: 2% of the reinforcing agent in Example 13 was changed to 6% of the reinforcing agent.

Example 16

This example was performed according to Example 13, except that: 2% of the reinforcing agent in Example 13 was changed to 8% of the reinforcing agent.

Example 17

This example was performed according to Example 13, except that: 2% of the reinforcing agent in Example 13 was changed to 10% of the reinforcing agent.

Comparative Example 5

This comparative example was performed according to Example 13, except that: 2% of the reinforcing agent in Example 13 was changed to 0% of the reinforcing agent.

The gel temporary plugging agents prepared in Examples 13-17 and Comparative Example 5 were cut separately with scissors into rectangular gel blocks (4 cm in length, 3 cm in width, and 2 cm in height). They were tested and analyzed using a TAXT PLUS texture analyzer. The analysis results are shown in Table 3.

TABLE 3

Hardness and elasticity data of the gel temporary plugging agents prepared in Examples 13-17 and Comparative Example 5

| No. | Reinforcing agent content | Hardness/N | Elasticity/mm |
|---|---|---|---|
| Example 13 | 2% | 19.8 | 4.87 |
| Example 14 | 4% | 40.0 | 7.76 |
| Example 15 | 6% | 42.0 | 9.50 |
| Example 16 | 8% | 39.3 | 9.08 |
| Example 17 | 10% | 32.3 | 7.92 |
| Comparative Example 5 | 0% | 16.7 | 3.49 |

As can be seen from Table 3, compared with Comparative Example 5 without the reinforcing agent, the hardness and elasticity of the gel temporary plugging agents prepared in Examples 13-17 first increase and then decrease with the increase of the reinforcing agent content, and when the concentration of the reinforcing agent is 6%, the hardness and elasticity of the temporary plugging agent reach maximum values. Therefore, the hardness and elasticity of the gel temporary plugging agent could be controlled within a certain range by changing the reinforcing agent content.

Example 18

Provided was a gel temporary plugging agent, composed of a bovine serum albumin structural unit, an acrylamide reinforcing agent structural unit, and a cross-linking structural unit formed by N,N'-methylenebisacrylamide, where the bovine serum albumin structural unit and the acrylamide reinforcing agent structural unit were chemically bonded via the cross-linking structural unit to form a three-dimensional network structure; and a mass ratio of the animal protein structural unit to the reinforcing agent structural unit was 4:1.

The above gel temporary plugging agent was prepared by a method consisting of the following steps:

In percentages by mass, 8% of bovine serum albumin, 20% of the distiller's grains-filtered liquid, 2% of acrylamide reinforcing agent, 0.5% of N,N'-methylenebisacrylamide cross-linking agent, 3% % of ammonium persulfate gelation inducer, and the balance of water were mixed by stirring at 400 r/s, and a resulting mixture was injected into a sandpack tube with a permeability of 1111.4 mD. Both ends of the sandpack tube were then sealed with plastic wrap, and placed at 60° C. for gelation, to obtain the gel temporary plugging agent.

Example 19

This example was performed according to Example 18, except that: 2% of the reinforcing agent in Example 18 was changed to 4% of the reinforcing agent; and the permeability was changed from 1111.4 mD to 1087.4 mD.

Example 20

This example was performed according to Example 18, except that: 2% of the reinforcing agent in Example 18 was changed to 6% of the reinforcing agent; and the permeability was changed from 1111.4 mD to 1105.2 mD.

Example 21

This example was performed according to Example 18, except that: 2% of the reinforcing agent in Example 18 was changed to 8% of the reinforcing agent; and the permeability was changed from 1111.4 mD to 1119.7 mD.

Example 22

This example was performed according to Example 18, except that: 2% of the reinforcing agent in Example 18 was changed to 10% of the reinforcing agent; and the permeability was changed from 1111.4 mD to 1056.9 mD.

Comparative Example 6

This comparative example was performed according to Example 18, except that: 2% of the reinforcing agent in Example 18 was changed to 0% of the reinforcing agent; and the permeability was changed from 1111.4 mD to 1095.2 mD.

In the present disclosure, the plugging performance of the gel temporary plugging agents was tested by water flooding method, and pressure changes were recorded in real time. The plugging performance results of the gel temporary plugging agents prepared in Examples 18-22 and Comparative Example 6 on sandpack tubes with different permeabilities are shown in Table 4.

TABLE 4

Plugging performance of the gel temporary plugging agents prepared in Examples 18-22 and Comparative Example 6 on sandpack tubes with different permeabilities

| No. | Reinforcing agent dosage | Permeability/ mD | Plugging Pressure/ MPa |
|---|---|---|---|
| Example 18 | 2% | 1111.4 | 15.48 |
| Example 19 | 4% | 1087.4 | 21.12 |
| Example 20 | 6% | 1105.2 | 24.69 |
| Example 21 | 8% | 1119.7 | 20.03 |
| Example 22 | 10% | 1056.9 | 18.46 |
| Comparative Example 6 | 0% | 1095.2 | 14.54 |

As can be seen from Table 4, compared with Comparative Example 6 without reinforcing agent, the plugging pressures of the gel temporary plugging agents prepared in Examples 18-22 first decrease and then increase with the increase of the reinforcing agent content, and when the concentration of the reinforcing agent is 6%, the plugging pressure of the temporary plugging agent reaches the maximum value. Therefore, the plugging pressure of the gel temporary plugging agent could be controlled within a certain range by changing the reinforcing agent content.

In summary, the gel temporary plugging agent prepared by the present disclosure could be applied for temporary plugging in low-temperature reservoirs at 20-60° C.

The above descriptions are only preferred embodiments of the present disclosure and are not intended to limit the present disclosure in any form. It should be pointed out that for those skilled in the art, several modifications and improvements could be made without departing from the principle of the present disclosure, and these modifications and improvements should also be regarded as falling within the scope of the present disclosure.

What is claimed is:

1. A method for preparing a gel temporary plugging agent, comprising:

mixing an animal protein, a gelation promoter, a reinforcing agent, a cross-linking agent, a gelation inducer, and water, and then performing gelation to obtain the gel temporary plugging agent; wherein the gelation promoter comprises a distiller's grains-filtered liquid;

relative to total raw materials for mixing, the animal protein is in an amount of 2% to 10%, the gelation promoter is in an amount of 8% to 30%, the reinforcing agent is in an amount of 2% to 10%, the cross-linking agent is in an amount of 0.5% to 2%, the gelation inducer is in an amount of 0.5% to 2%, and a balance is water, each in percentages by mass; and the gel temporary plugging agent comprises an animal protein structural unit, a reinforcing agent structural unit, and a cross-linking structural unit, wherein the animal protein structural unit and the reinforcing agent structural unit are chemically bonded via the cross-linking structural unit to form a three-dimensional network structure;

an animal protein in the animal protein structural unit comprises one selected from the group consisting of bovine serum albumin and whey protein;

the reinforcing agent structural unit is one selected from the group consisting of an acrylamide structural unit and an acrylamide sulfonic structural unit; and the cross-linking structural unit is formed from one selected from the group consisting of N,N-methylenebisacrylamide, dimethyldiallylammonium chloride, and divinylbenzene.

2. The method as claimed in claim 1, wherein the gelation is performed at a temperature of 85-90° C. for 1.5-2 hours.

* * * * *